(12) United States Patent
Stauffer

(10) Patent No.: US 11,624,511 B2
(45) Date of Patent: Apr. 11, 2023

(54) ZERO-FOSSIL-FUEL-USING HEATING AND COOLING APPARATUS FOR RESIDENCES AND BUILDINGS WITH AN ARRAY FOR TRACKING THE SUN

(71) Applicant: David William Stauffer, Portland, OR (US)

(72) Inventor: David William Stauffer, Portland, OR (US)

( * ) Notice: Subject to any disclaimer, the term of this patent is extended or adjusted under 35 U.S.C. 154(b) by 0 days.

(21) Appl. No.: 17/321,100

(22) Filed: May 14, 2021

(65) Prior Publication Data
US 2022/0364740 A1    Nov. 17, 2022

(51) Int. Cl.
| F24D 17/00 | (2022.01) |
| F24S 20/20 | (2018.01) |
| F24S 20/60 | (2018.01) |
| F24S 30/425 | (2018.01) |
| F24S 23/30 | (2018.01) |

(52) U.S. Cl.
CPC .......... *F24D 17/0015* (2013.01); *F24S 20/20* (2018.05); *F24S 20/60* (2018.05); *F24S 23/31* (2018.05); *F24S 30/425* (2018.05); *F24D 2200/14* (2013.01); *F24S 2020/23* (2018.05)

(58) Field of Classification Search
None
See application file for complete search history.

(56) References Cited

U.S. PATENT DOCUMENTS

| 3,965,683 | A | * | 6/1976 | Dix | F03G 6/065 |
| | | | | | 60/641.15 |
| 3,994,435 | A | * | 11/1976 | Barr | F24S 10/72 |
| | | | | | 237/1 R |
| 4,000,850 | A | * | 1/1977 | Diggs | F24D 3/005 |
| | | | | | 126/613 |
| 4,004,574 | A | * | 1/1977 | Barr | F24S 10/72 |
| | | | | | 126/574 |
| 4,111,360 | A | * | 9/1978 | Barr | F24S 23/70 |
| | | | | | 126/628 |
| 4,123,003 | A | * | 10/1978 | Winston | F25B 9/004 |
| | | | | | 165/48.2 |

(Continued)

*Primary Examiner* — Avinash A Savani
*Assistant Examiner* — Deepak A Deean

(57) ABSTRACT

The invention provides an apparatus which can heat water using a Fresnel lens or magnifying glass to focus and concentrate sunlight on water-filled radiator-like tubes which move water, by the water pressure from a water spigot/bib (without pumping), to:

1. move the heated water through tubes to heat any space inside any building, and 2. provide steam to power a steam-powered electricity generator to provide electricity, and charge a battery, during daylight hours, and then use the charged battery to supply electricity during the night hours, and 3. move water, cooled by the subsurface ground, by water pressure from a water spigot/bib without pumping, into proximity with any air space inside any building to cool the air space, and 4. array a series of magnifying glasses or Fresnel lenses in order to catch the rays of the sun from sunrise to sunset and focus those rays on the car radiator-like tubes full of water in order to heat the water without using fossil fuels, and 5. support the, array of magnifying glasses or Fresnel lenses and car-radiator-like water tubes with arch structures to hear the weight and protect the structure from earthquake damage.

9 Claims, 5 Drawing Sheets

(56) References Cited

U.S. PATENT DOCUMENTS

| | | | | |
|---|---|---|---|---|
| 8,474,445 B2* | 7/2013 | Fairstein | ................. | F24S 80/54 |
| | | | | 126/600 |
| 10,072,637 B2* | 9/2018 | Stauffer | ................ | F24F 5/0046 |
| 2014/0216531 A1* | 8/2014 | Werner | ................... | F24S 40/85 |
| | | | | 136/251 |
| 2017/0356427 A1* | 12/2017 | Stauffer | .................... | F03G 6/00 |
| 2021/0181453 A1* | 6/2021 | Zolnowski | .............. | H02S 40/38 |

\* cited by examiner

ZERO-FOSSIL-FUEL-USING HEATING AND COOLING APPARATUS FOR RESIDENCES AND BUILDINGS WITH AN ARRAY FOR TRACKING THE SUN

CROSS-REFERENCE TO RELATED APPLICATIONS

It should be noted that the instant inventor, David William Stauffer, has already been awarded U.S. Pat. No. 10,072,637 A ZERO-FOSSIL-FUEL-USING HEATING AND COOLING APPARATUS FOR RESIDENCES AND BUILDINGS which he has incorporated In this application as public knowledge which he is entitled to use and which he gives his permission to himself to use in this new application. Inventor Stauffer has added novel patentable elements to U.S. Pat. No. 1,007,637, so he now seeks a patent on the new elements as well as the novel combination of new and old elements in a new juxtaposition, that make his structure earthquake-resistant and able to track the sun's rays throughout the day without the use of electricity.

STATEMENT REGARDING FEDERALLY-SPONSORED RESEARCH OR DEVELOPMENT

Not Applicable.

THE NAMES OF PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

The invention requires a source of water and water pressure that may be made available with another invention of David William Stauffer, as it is described in U.S. Pat. No. 13,734,978.

BACKGROUND OF THE INVENTION (1) Fields of the Invention:

(a) A zero-fossil-fuel-using, almost free, non-polluting apparatus to focus and magnify the sun's heat and then, without using any pumps, transfer that heat throughout a residence or a building, using only the water's heat conduction characteristics, gravity, and garden hose pressure to circulate the heat, and (b) A zero-fossil-fuel-using, almost free, non-polluting apparatus to capture the coolness of the subsurface ground, down four feet below the surface, and then, without using any pumps, transfer that coolness throughout a residence or a building using only the water's heat conduction characteristics, gravity and garden hose pressure to circulate the coolness, and (c) A zero-fossil-fuel-using, almost free, non-polluting apparatus structure to focus and magnify the sun's heat to run a steam-powered electricity generator to (i) provide, during daylight hours, immediate electricity, and (ii) charge, during daylight hours, a battery that can provide electricity during non-daylight hours.

(d) An array of magnifying glasses or Fresnel lenses to capture and focus the sun's direct rays from the time the sun rises in the east to the time the sun sets in the west by the use of a half-circle curved array that swivels along the axis created by a bar that is positioned to have one end point at the place where the sun rises above the horizon in the east and the other end point pointed at the p lace where the sun sets on the horizon, and which swivels to catch the most direct sun rays as the sun's path moves north in the winter and south in the summer for the northern hemisphere of the earth. It would be the opposite directions of sun movement for the southern hemisphere.

(e) a multi-arch support structure e.g., a two-arch structure as depicted in FIG. 5, to carry the roof weight of the magnifying glasses or Fresnel lenses and the car-radiator-like tubes filled with water, as well as support the entire building structure, to decrease or prevent earthquake damage to the structure on which the invention is built.

(2) Description of Related Art including information disclosed under 37 CFR 1.97 and 1.98; it is common knowledge that:

1. Every day, the sun rises in the east, shines all day, heats the entire world, and then sets in the west. Assuming a flat horizon (without mountains), the sun arises in the eastern sky and goes about 180 degrees around the curvature of the earth before it sets in the west. A half-circle curved structure with an array of magnifying glasses or Fresnel lenses can be positioned above the roof of any building so that the array can catch the most direct sunrays from the sun to magnify them and heat water in car-radiator-like tubes. The array of magnifying glasses or Fresnel lenses can be harnessed to a straight pole (i in FIG. 4) that (for a northern hemisphere location) will allow the array to pivot on the pole about one-half a degree per day to track the sun's path as it slowly goes north during the winter-ceasing and reversing its direction of northern travel at the autumnal equinox-and south during (he summer-ceasing and reversing its direction of southern travel at the vernal equinox.
2. A magnifying glass, or a Fresnel lens, can focus the sun's rays on a piece of paper to ignite the paper at about 451 degrees Fahrenheit.
3. Humans heat their houses so that the temperature in the house is between 60 degrees and 80 degrees Fahrenheit.
4. Humans heat their hot water heaters, in their houses, so that the temperature in the hot water heater is between 100 degrees and 124 degrees Fahrenheit. 125 degrees Fahrenheit would scald human skin, so hot water heaters should never be set to heat water more than 124 degrees Fahrenheit.
5. All over the world, the temperature of earth that is four feet below the surface is always between 50 and 55 degrees Fahrenheit.
6. If a house has a subsurface basement level, the temperature in the basement will be lower than the first floor because the walls of the basement that are sub-ground-surface more than four feet below the first floor conduct the 50 to 55 degree Fahrenheit temperature of the dirt on the outside of the wall to cool the air inside the basement.

7. Homeowners generally buy electricity that is delivered through utility lines from a utility company, but it is possible to obtain electricity from a privately-operated electricity generator unit.
8. Most residences and buildings in America are supplied with water faucets which release water that is under the pressure of gravity, fed from a water level that is higher than the faucet, such as the 20-meter highwater towers in most cities, or a water shed that sits higher than the level of the residence or building. The water pressure from the faucets can force water through hoses to the top level of the residence or to the basement of the house. This water pressure is the result of the free, non-polluting force of gravity.

In winter, homeowners usually heat their houses by burning fossil fuels such as coal, oil and gas. Then, during summer, homeowners cool their houses with air conditioners many times using electricity-generated by the burning of fossil fuels. Without regard to whether it is hot or cold outside their house, those same homeowners may use fossil fuels year around to heat the house hot water heater to keep a ready supply of hot water available for washing dishes, cloths, hands, and human bodies. Finally, most houses get electricity from an electricity- selling utility company, but some get their electricity from a privately-owned electricity generator unit.

This invention provides a novel apparatus to:
(1) replace the burning of fossil fuels, as a heat source, with the sun's heat when the weather is cold, and
(2) when the weather is hot, replace the present use of electricity for air conditioning with the natural cooling by the subsurface ground four feet below the ground's surface, on which residences and buildings are built, and
(3) provide a zero-fossil-fuel-using, almost free, non-polluting apparatus to focus and magnify the sun's heat to run a steam-powered electricity generator to:
(i) provide, during daylight hours, immediate electricity, and
(ii) to charge, during daylight hours, a battery that can provide electricity during non-daylight hours.

That is, this invention provides a novel apparatus to:
(1) transfer water heated by the sun's heat into proximity with the air space inside any house to warm that house, and
(2) provide heating for the hot water heater, and
(3) during hot weather, to move water cooled by the subsurface ground into proximity with the air space inside any house or building to cool the house or building, and
(4) provide a zero-fossil-fuel-using, almost free, non-polluting apparatus to focus and magnify the sun's heat to run a steam-powered electricity generator to: (i) provide, during daylight hours, immediate electricity, and (ii) to charge, during daylight hours, a battery that can provide electricity during non-daylight hours.
(5) Provide a non-electronic, no energy-using apparatus to track the sun as it moves through the day, to focus the sunrays on the array of magnifying glasses or Fresnel lenses, so that the sunrays are always focused to produce the desired heating element to heat the water in the car-radiator-like tubes (see FIG. 4). The array of magnifying glasses or Fresnel lenses are positioned (see FIG. 4) so that, as soon as the sun comes up over the eastern horizon, the focused sunrays will start to heat the water in tire car-radiator-like tubes and continue to heat the water every minute of the day until the sun sinks below the western horizon.
(6) All of the above heating and cooling will be accomplished without the air pollution caused by burning fossil fuels, using the heat of the sun and the coldness of the subsurface earth.
(7) Focused sunlight, either through a magnifying glass or through a Fresnel lens, can produce temperatures at a focal point that are so hot that they can cause rocks to melt and start fires. The array structures in this invention are designed so that the sunrays are controlled so that they do not heat the water in the car-radiator-like tubes to a focal point heat of more than 212 degrees Fahrenheit, or the temperature at which water boils and emits steam (to run a steam-run electricity generator), and so that the focal point does not heat any substance other than the car-radiator-like tubes-or cause any fires.

This patent application uses commonly accepted and known scientific knowledge which is so well known that it is not necessary to cite the prior art of patent cases. To this common knowledge, Inventor Stauffer has added;
(a) The novel invention of an apparatus that uses the subsurface coolness of the earth to cool a building, and
(b) that coolness is transferred throughout a residence or a building by the novel use of garden hose water pressure, and
(c) Both the coolness of the subsurface ground and the heat of the focused sun rays is transferred throughout the residence or building by the natural heat and cold conduction properties of water in pipes, and by the garden hose water pressure that is common to most residences and buildings.
(d) Finally, the instant inventor is entitled to a patent for arranging known elements in a new apparatus combination, in a previously-un-invented juxtaposition that produces free and pollution-free heating and cooling of residences on one or more levels of buildings with subsurface basements. In other words, the instant: inventor has invented a new combination of water pipes and hoses, water faucets, fans, arrays of magnifying glasses or Fresnel lens, building structures, and hot water heaters that produces a novel and beneficial benefit to homeowners, small building owners, and the world's polluted environment.

There are literally hundreds of patents on many of the elements of the present invention, but there is no patent that claims an apparatus that includes all of the elements of the present patent application, and no prior art that arranges all the claimed elements in the manner that is claimed in the present invention. No other inventor has previously claimed all the elements of the instant inventor's novel invention, which can heat and cool houses with free heating from the sun and with free cooling from the subsurface of the earth-all without the pollution from burning fossil fuels which threatens the earth's environment.

Heating water is the second largest energy user in the home. In fact, 4% of America's total energy consumption is attributable to heating water. This invention is an almost pollution-free apparatus that has the capability of cutting the cost of heating water using only the heat of the sun. In other words, this invention, when universally-implemented, will decrease America's total energy consumption of fossil fuels for heating water. Because the sun shines on all countries, similar reductions in fossil fuel energy use for heating water will be possible in all other countries of the world--even when it's cloudy. Generally, the invention focuses the sun's rays on a car-radiator-like series of small water tubes that can be heated to 451 degrees Fahrenheit, just like a focused magnifying glass can burn a piece of paper, which has a flashpoint of about 451 degrees Fahrenheit. Obviously, no person wants to heat their house to 451 degrees Fahrenheit-that's too hot for humans-so the sun's rays will be focused so that the house temperature is only in the range of 60 degrees Fahrenheit to 80 degrees Fahrenheit for house heat and no more than 124 degrees Fahrenheit for hot water heating.

In addition, this invention will also use the same radiator pipe/tank structure to cool houses during days of hot weather. At depths below four feet, ground temperature stays a constant 50 to 55 degrees Fahrenheit year-round. Actually, that ground is a constant 50 to 55 degrees Fahrenheit everywhere in the world, even where it's hot on the surface like the heat on desert surfaces. That's because the sun is warming the surface, but the hot rays from the sun do not penetrate more than 4 feet below the earth's surface and do not heat ground that is more than 4 feet below the earth's surface. So, if you dig below 4 feet, you will hit soil that is 50 to 55 degrees Fahrenheit, even in the Sahara Desert.

Two-thirds of all homes in the United States have an air conditioner. Air conditioners use about 5% of all the electricity produced in the United States, at an annual cost of more than $11 billion to homeowners. As a result, roughly 100 million tons of carbon dioxide are released in the air each year-an average of about two tons for each home with an air conditioner,

BRIEF SUMMARY OF THE INVENTION

I. An apparatus capable of transferring the free and zero-polluting sun's heat to:
(1) heat residences and buildings, and
(2) heat water in hot water heaters, and
(3) heat water for a steam-powered electricity generator, and to charge batteries in order to produce electricity during non-daylight hours.

II. When the weather is hot, use much of the same free and zero-polluting apparatus to transfer the subsurface ground's coolness to upper levels of the residences or buildings in order to cool those residences and buildings.

The instant inventor will make claims for:
An apparatus comprising:
a building,
water,
a garden hose spigot/bib or kitchen faucet for delivering the water under pressure,
a solar collector,
a magnifying glass or Fresnel lens that focuses sunlight on the solar collector,
a transfer conduit fluidly connecting the garden hose spigot/bib or kitchen faucet and the solar collector, the transfer conduit delivering the water under pressure from the garden hose spigot/bib or kitchen faucet to the solar collector to be heated.
a first piping structure fluidly connected to the solar collector and physically distributed internally through the building, the first piping structure receiving heated water from the solar collector and transmitting the heated water through the building for heating air space within the building,
a steam-powered expander downstream of and fluidly connected to the solar collector, the steam-powered expander receiving steam from the solar collector,
an electricity generator operatively connected to the steam-powered expander for generating electricity,
wherein the first piping structure is additionally fluidly connected to the steam-powered expander for additionally receiving steam and/or heated water from the steam-powered expander and transmitting the steam and/or heated water through the building for heating air space within the building,
wherein the water is circulated through the transfer conduit and the first piping structure using only gravity and pressure from the garden hose spigot/bib or kitchen faucet, without using a pump for additional pressurization,
wherein the apparatus is a zero-fossil-fuel-using, non-carbon-dioxide-emitting apparatus,
wherein the apparatus has an array of magnifying glasses or Fresnel lens structured to arise above the roof of the residence or building and focus the sun's rays on a structure of car-radiator-like tubes foil of water, in order to heat the water for space heating and for generating steam to produce steam-generated electricity from the time the sun rises in the morning to the time that the sun sets in the evening, and such apparatuses have heat sensors to detect when the focused sun rays are above 212 degrees Fahrenheit and curtains are needed to block the sun and decrease the temperature of the focused sun rays, and
wherein there are two or more arch structures that go from the ground to the roof and will hold the weight of the array of magnifying glasses or Fresnel lens, as well as the weight of car-radiator-like tubes that are filled with water, and which are connected to the residence or building and provide additional structural support to reduce or eliminate damages from earthquakes.

An apparatus according to the first apparatus description, above, further comp rising a second piping structure fluidly connected to the garden hose spigot/bib or kitchen faucet and at least in part being physically distributed internally through a subsurface below a ground surface of the building, the second piping structure being configured to receive the water under pressure from the garden hose spigot/bib or kitchen faucet, to transmit the water in heat exchange relationship with the subsurface to cool the water, and to transmit the water through the building for cooling an air space within the building, wherein the water is circulated through the second piping structure using only gravity and pressure from the garden hose spigot/bib or kitchen faucet, without using a pump for additional pressurization.

An apparatus according to the description of the second piping structure, above, wherein the second piping structure is fluidly connected to the first piping structure such that the first piping structure is also configured for cooling an air space within the building, when the apparatus is used for space cooling instead of space heating.

An apparatus according to the description of the second piping structure, above, wherein the subsurface is at least four feet or deeper below a ground surface of the building.

An apparatus according to the first piping apparatus description, above, further comprising a hot water tank fluidly connected to the first piping structure and configured to receive water from the first piping structure for storing hot water.

An apparatus according to the description of the second piping apparatus, above, further comprising a hot water tank fluidly connected to the second piping structure and configured to receive water from the first piping structure for storing hot water.

An apparatus according to the description of the first piping apparatus, above, further comprising a hot water tank fluidly connected to the piping structure and configured to receive water from the first piping structure for storing hot water.

A sunray-catching and sunray-focus-directing array structure that is structured so that, it catches and focuses the sun's rays from the moment the sun arises in the east, during the day-light hours, until the moment the sun sets in the west.

BRIEF DESCRIPTION OF THE SEVERAL VIEWS OF THE DRAWINGS

FIG. 2 is a figure which looks at a two-story house, with a basement, from the west. Cold water will flow from the cool basement to the upper levels of the residence or building mid cool the air.

FIG. 3 looks at a two-story house, with a basement, from the west. Water will flow from the garden hose faucet to a car-radiator-like-set of tubes on the roof of the residence or building and the sun's rays will be focused on that car-radiator-like set of tubes to create steam to drive the turbines of an electricity generator.

FIG. 4 is the curved structure that will be positioned on the roof of a dwelling or building that will also swivel along the i pole, which will have its East end (see E inf FIG. 4) pointing at the place on the horizon where the sun rises on the morning of the summer solstice (about Jun. 20) and its west end (see W in FIG. 4) pointing at the place on the horizon where the sun sets i n the evening of the summer solstice (about Jun. 20). There will be an array of magnifying glasses or Fresnel lenses (see d in FIG. 4) arranged in a half-circle which will swivel along the i axis (see i in FIG. 4) to be in the best position to catch the sun's direct rays and focus those sun's rays on the car-radiator-like water tubes (see e in FIG. 4) in order to heat the water in the tubes.

DETAILED DESCRIPTION OF THE INVENTION

Figure 1:
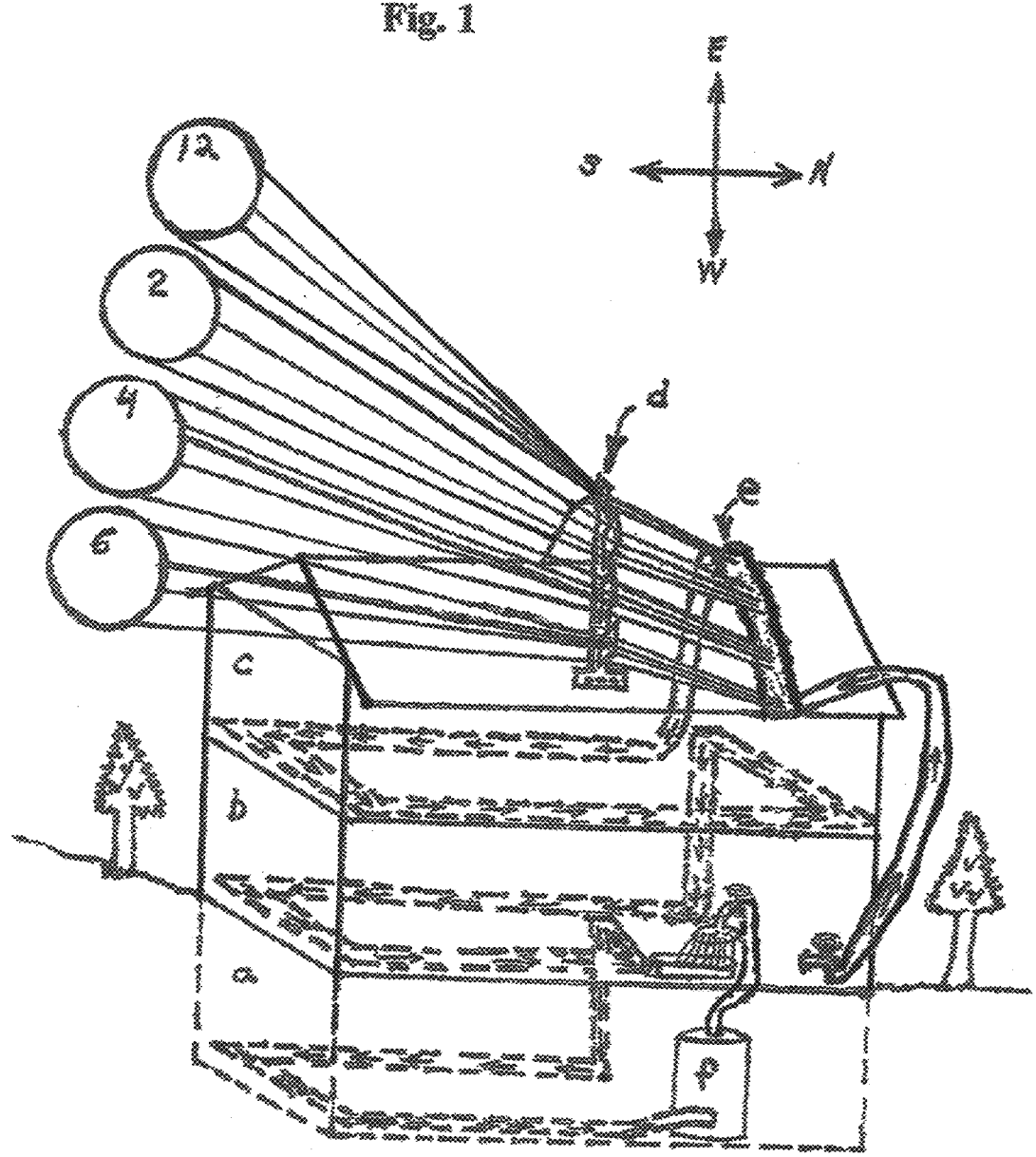
FIG. 1: The Water Heating Apparatus. The Figure looks at a two-story house, with a basement, from the west, with four different positions of the sun, as it travels from east to west. At different times of the afternoon, the sun's rays hit a row of magnifying glasses or Fresnel lens, which focus the sun's rays on a car-radiator-like set of water tubes that take heated water from the sun's rays on the roof to ail other levels of the residence or building and heat the air on each level.

FIG. 1: The Water Heating Apparatus. FIG. 1 looks at a two-story- house from the west, with four different positions of the sun, as it travels from east to west. The top sun position is 12 Noon (see the circled 12), the next lower position is 2 p.m. (see the circled 2), the next lower position is 4 p.m. (see the circled 4), and the bottom position is 6 p.m. (see the circled 6). The a level is the below-ground basement, the b level is the ground-level building, and the c level is the second story of the residence or building, d is an adjustable holding structure that holds a row of magnifying glasses or Fresnel lens that can be tilted to catch the rays of the sun and focus them on e, a holding structure that holds a row of car-radiator-type tubes holding water that will heat, but not melt, when the sun's rays are focused on them. Such tubes will allow water to flow through the car-radiator-like tubes so that the focused sun's rays can heat that, water, and then the heated water will flow through the network of car-radiator-like tubes that take the sun-heated water to each level of the residence or building to heat that residence or building, ending by going into the hot water heater, f, so that the hot water heater can send the hot water (124 degrees Fahrenheit) to the hot water faucets of the residence or building, or, if the water has been heated, but not heated enough to be 124 degrees Fahrenheit, the hot water heater will detect the temperature and heat the water the rest of the way to 124 degrees Fahrenheit. Water will initially flow into all the water tubes by turning on the garden hose faucet (or other faucet). The water will be heated by the sun. That hot water will be conducted throughout the water tubes by the radiation of heat through the water, but will also move faster when water is released from the system—such as when a person takes a shower and releases hot water from the shower nozzle, and when hot water is released from the kitchen sink faucet. When water is released from the residence or building water pipes, more water will flow into the water pipes, and then that water, too, will be heated by the sun, or cooled by the subsurface ground.

The sun's heat will be transferred by two mechanisms:

(i) The heat will be transferred by being radiated from the hot water in the direct path of the focused sun rays to all the water in the car-radiator-like tubes that form a water tank. Just like the burner under a water kettle heats the water on the bottom of the kettle and that heat radiates to the rest of the water in the kettle, the focused sun rays will be the "burner" and the heated water in the direct path of the focused sun rays will radiate its heat to the rest of the water in the car-radiator-like tubes that form a water tank, so that all the water on all levels of the residence or building will be heated to somewhere between 60 and 80 degrees Fahrenheit to heat the residence or building, and that water will also flow into the hot water heater, f, to be further heated to a maximum of 124 degrees Fahrenheit, if necessary. In the best case situation, the traditional hot water heater would never need to bum non-sun energy to heat the water to 124 degrees Fahrenheit and the owner of the building would no longer bum that energy nor pay for the cost of that energy.

(ii) The water will be under the garden-hose pressure that occurs when a garden hose is turned on, but the nozzle on the other end of tire garden hose stops the flow of water. The water will be released, like a garden hose nozzle that has been turned on, when a hot water faucet (such as a shower faucet or a kitchen sink faucet) is turned on, and hot water flows out of the system and allows more sun-heated hot water from the roof to go through the car-radiator-like tubes and heat each level of the building. As previously stated, if the water is moving so fast that the sun's rays do not completely heat the water to 124 degrees Fahrenheit, the hot water heater will sense that deficiency and heat the water further before the water is released from a faucet. Also, when the sun is not shining at night, the hot water heater will heat the water to 124 degrees Fahrenheit. In order to stop the hot water heating during hot weather, there will be a shade that will block the rays of the sun from hitting the magnifying glass(es) or Fresnel lense(s). In similar manner, if the hot water heater senses that the water is too hot, it will mix it with cold water to bring the temperature down to 124 degrees Fahrenheit.

The invention is designed to have an apparatus that will be constructed on the roof of the residence or building and be open to the air. In order to avoid birds and other animals (including humans) from accidentally getting burned by the focused rays of the sun, there will be a casing around the entire structure that will let the sun's rays enter it but will prevent any other birds or animals from being hit by the focused sun rays.

Figure 2:
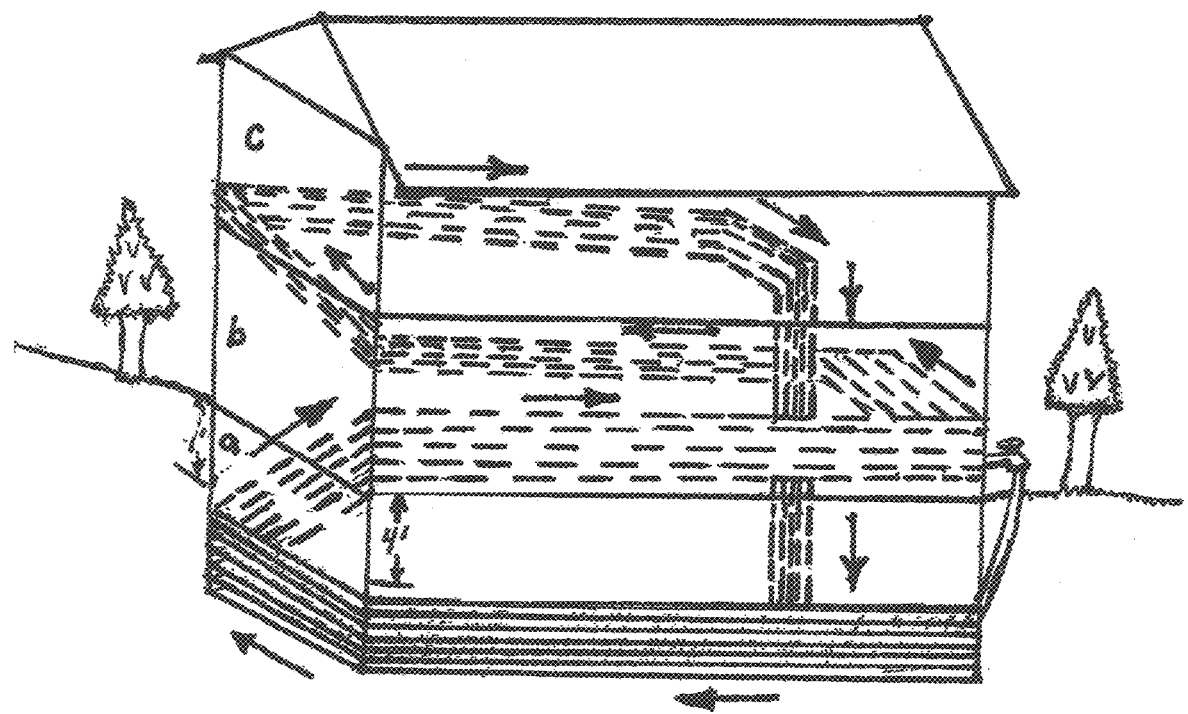
FIG. 2: The Water Cooling Apparatus.

FIG. 2: The Cooling Apparatus. Looking at a two-story house from the west, cold water from the house water faucet is directed to a car-radiator-like set of tubes that go down to the basement to a level that is lower than four feet below the ground surface where It is spread out so that the tubes come into contact with the 50 to 55 degree Fahrenheit walls of the basement, which cool the already-cool garden hose water in the tubes. The water tubes go around the basement (a) to absorb the cool temperature of the walls, and then the tubes go up to the first floor (the b level) and go around the walls of the b level; then the tubes go up to the second floor (the c level) and go around the walls of the c level; then the water goes from the c level back to a water drain on the a level-or to the lawn outside the b level of the house. The water from the water faucet will be turned on to a low level of current so that it slowly goes through the basement level and becomes 50 to 55 degrees Fahrenheit, and then slowly goes through the upper levels of the residence or building to cool those levels, and then slowly goes to the basement water drain or slowly goes to the outside lawn. Faucet water is usually somewhat cool (50 to 55 degrees Fahrenheit) because it comes from subsurface levels of ground, so the water will already be that cool temperature even before it is cooled by travelling along the basement walls. As that water travels through the upper levels of the house, it will cool the air to, perhaps, 55 to 60 degrees Fahrenheit.

Both the heating and cooling water systems assume that the residence or building has the usual constant supply of water that will flow under the pressure of a garden hose, if this water supply is not readily available, see U.S. Pat. No. 1,373,4978 of David William Stauffer.

There will be fans on all building levels above the basement that blow the hot air that has been heated by the hot pipes, or the cool air, that has been cooled by the cool water from the basement, from the car-radiator-like pipes out into the air space inside the building so that it either heats or cools that air space.

Figure 3:
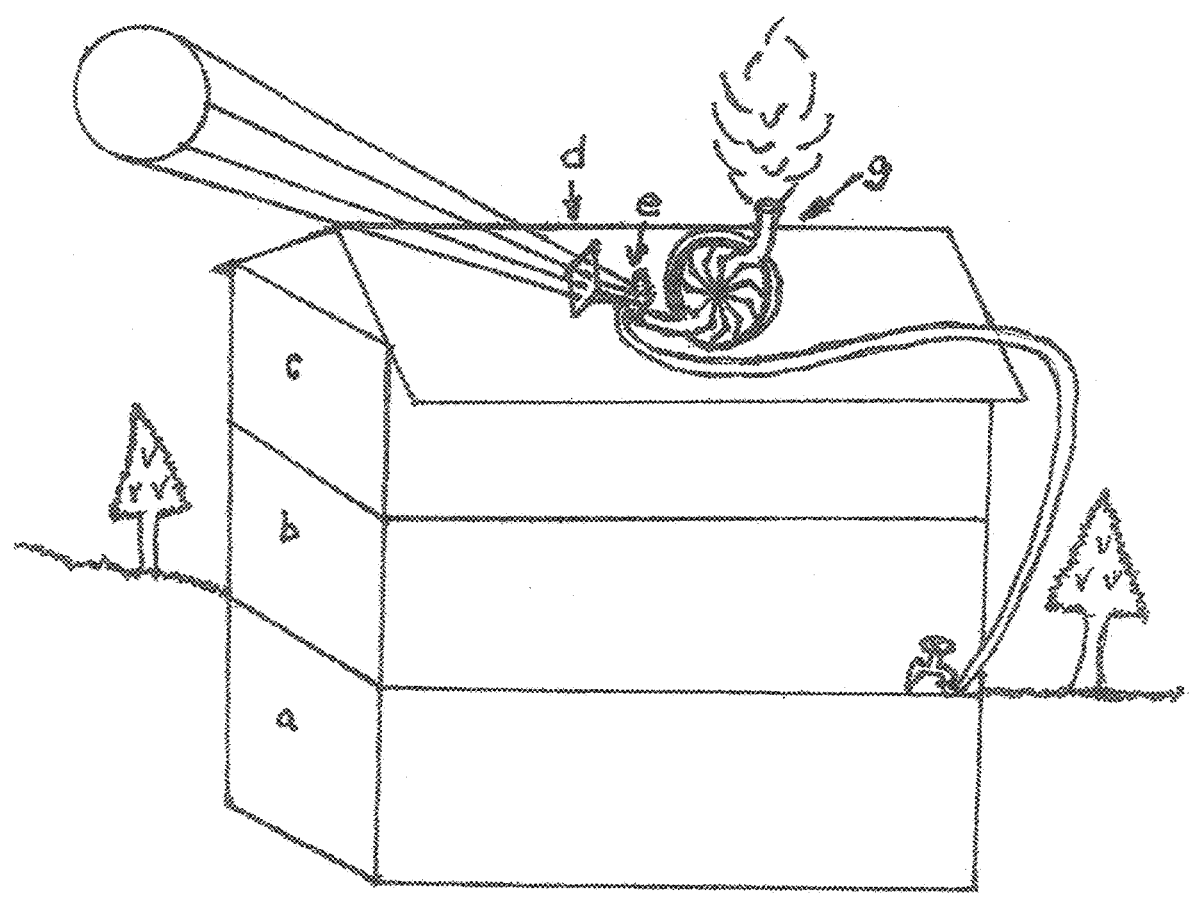
FIG. 3: The Steam-powered Electricity Generator Apparatus.

FIG. 3: The Steam-powered Electricity Generator Apparatus. Water will flow from the garden hose faucet to the roof of the residence or building to car-radiator-like tubes that form a many-tubed tank (e), and the sun's rays will be focused by magnifying glasses or Fresnel lens (d) on this car-radiator-like tank (e) to create steam to drive the turbines of an electricity generator (g).

Figure 4:
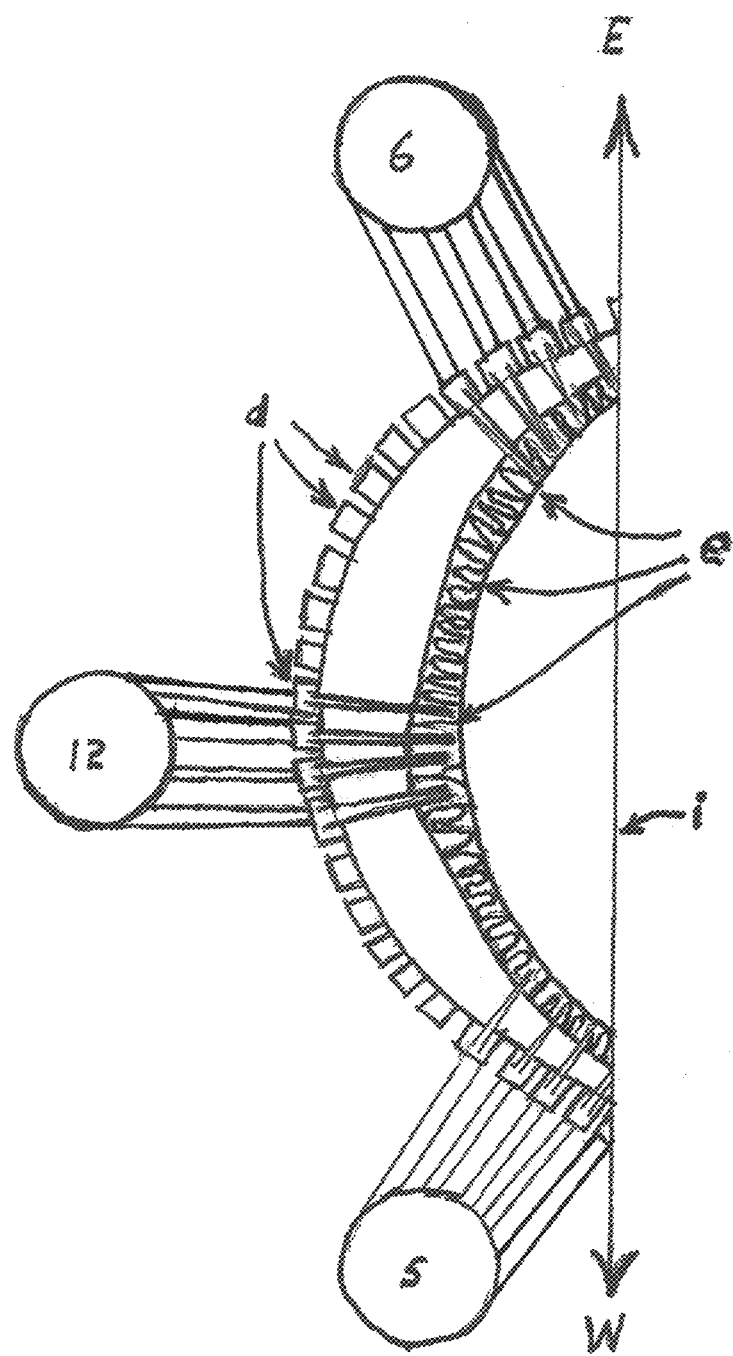
FIG. 4: The Curved and Swiveling Apparatus to Catch and Focus the Sun's rays.

FIG. 4: The Curved and Swiveling Apparatus to Catch and Focus the Sun's Rays. FIG. 4 is the curved structure that will be positioned on the roof of a dwelling or building that will also swivel along the i pole (see i in FIG. 4), which will have its East end (see E in FIG. 4) pointing at the place on the horizon where the sun rises on the morning of the summer solstice (about Jun. 20) and its west end (see W in FIG. 4) pointing at the place on the horizon where the sun sets in the evening of the summer solstice (about Jun. 20). There will he an array of magnifying glasses or Fresnel lenses (see d in FIG. 4) arranged in a half-circle which will swivel along the i axis (see i in FIG. 4) to be in the best position to catch the sun's direct rays and focus those sun's rays on the car-radiator-like water tubes (see e in FIG. 4) in order to heat the water in the tubes.

Figure 5:
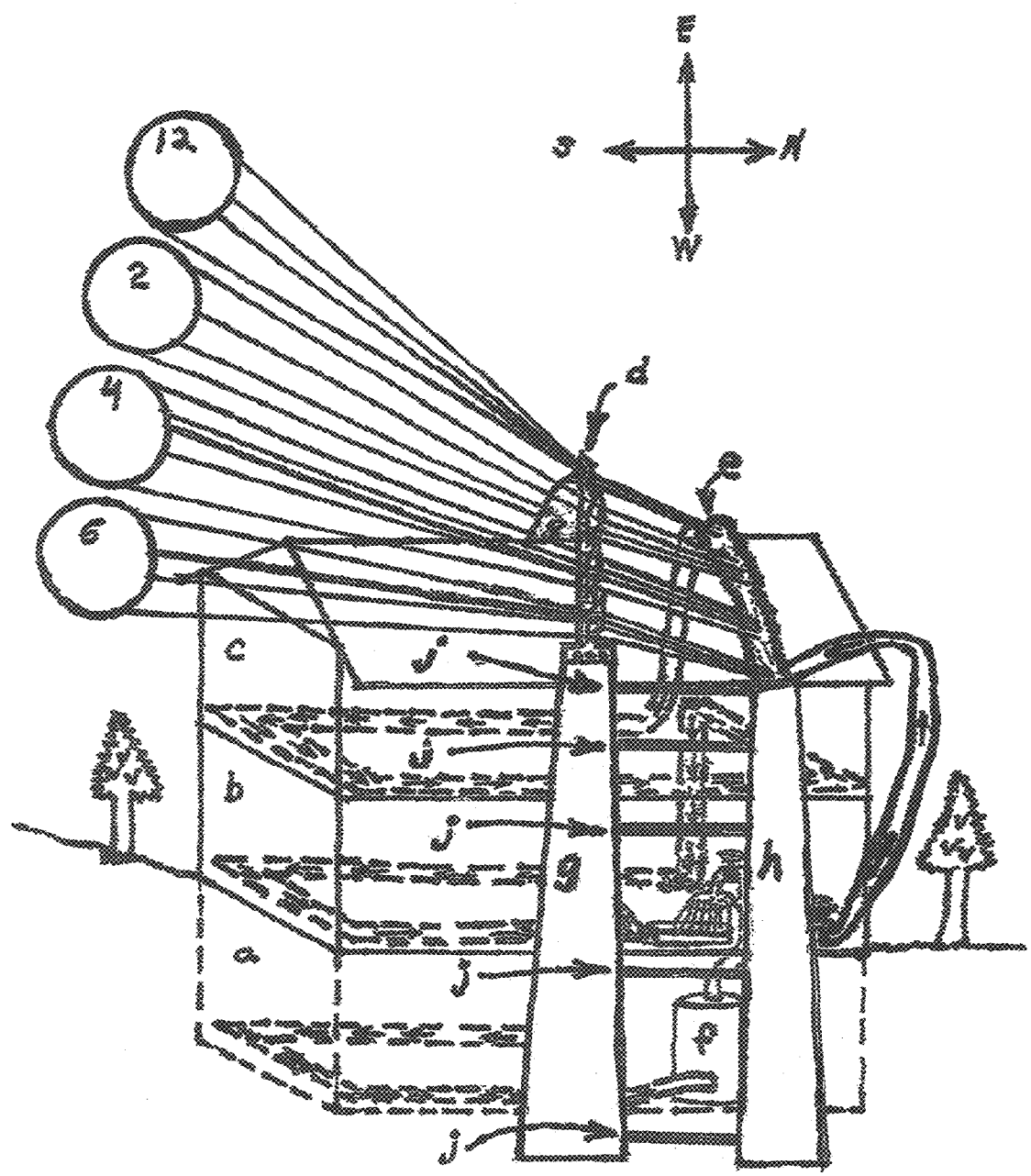
FIG. 5. Two arch supports that will be connected by support bars that will bear the weight of the magnifying glasses and car-radiator-like tubes as well as provide an earthquake-resistant sturdy structure to bolster the entire residence or building.

FIG. 5: Two arch supports (g and h in FIG. 5) that will be connected by support bars j (see j's in FIG. 5) that will bear the weight of the magnifying glasses (see d in FIG. 5) and car-radiator-like tubes (see e in FIG. 5) as well as provide an earthquake-resistant sturdy structure for the entire residence or building.

The invention claimed is:

1. An apparatus comprising:
    a building, or residence, with a roof in position to catch the sun's rays so that a magnifying glass or Fresnel lens can focus and concentrate the sun's rays on an array of water-filled radiator tubes,
    water,
    a garden hose spigot/bib or faucet for delivering the water under pressure,
    a solar collector,
    a magnifying glass or Fresnel lens that focuses sunlight on the solar collector,
    a transfer conduit fluidly connecting the garden hose spigot/bib or faucet and the solar collector, the transfer conduit delivering the water under pressure from the garden hose spigot/bib or faucet to the solar collector to be heated,
    a first piping structure fluidly connected to the solar collector and physically distributed internally through the building, the first piping structure receiving heated waterfrom the solar col lector and transmitting the heated water through the building for heating air space within the building,
    a steam-powered expander downstream of and fluidly connected to the solar collector, the steam-powered expander receiving steam from the solar collector,
    an electricity generator operatively connected to the steam powered expander for generating electricity, wherein the first piping structure is additionally fluidly connected to the steam-powered expander for additionally receiving steam and/or heated waterfrom the steam-powered expander and transmitting the steam and/or heated water through the building for heating air space within the building,
    wherein the water is circulated through the transfer conduit and the first piping structure using only gravity and pressure from the garden hose spigot/bib or faucet, without using a pump for additional pressurization
    wherein the magnifying glass or Fresnel lens consists of a curved and swiveling single line array of magnifying glasses or Fresnel lenses arranged in a half-circle positioned on the roof of the building or residence, which swivels along an axis pole so as to catch and focus the sun's rays on a single line of water-filled radiator tubes,
    the axis pole's East end pointing at the place on the horizon where the sun rises on the morning of the summer solstice and the axis pole's West end pointing at the place on the horizon where the sun sets in the evening of the summer solstice, and
    wherein the single line array swivels along the axis pole to be in the best position to catch the sun's direct rays and focus those sun's rays on the radiator tubes, as the sun goes from east to west during each day and north to south and back to north as the seasons change from winter to summer to winter, in order to heat the water in the radiator tubes.

2. An apparatus according to claim 1, further comprising of a second piping structure fluidly connected to the garden hose spigot/bib or faucet and at least in part being physically distributed internally through a subsurface below a ground surface of the building, the second piping structure being configured to receive the water under pressure from the garden hose spigot/bib or kitchen faucet, to transmit the water in heat exchange relationship with the subsurface to cool the water, and to transmit the water through the building for cooling an air space within the building, wherein the water is circulated through the second piping structure using only gravity a nd pressure from the garden hose spigot/bib or faucet, without using a pump for additional pressurization.

3. An apparatus according to claim 2, wherein the second piping structure is fluidly connected to the first piping structure such that the first piping structure is also configured for cooling an air space within the building, when the apparatus is used for space cooling instead of space heating.

4. An apparatus according to claim 2, wherein the subsurface is at least four feet or deeper below a ground surface of the building.

5. An apparatus according to claim 1, further comprising of a hot water tank fluidly connected to the first/second combined piping structure and configured to receive water from the first piping structure for storing hot water.

6. An apparatus according to claim 2, further comprising of a hot water tank fluidly connected to the first/second combined piping structure and configured to receive water from the first piping structure for storing hot water.

7. An apparatus according to claim 3, further comprising of a hot water tank fluidly connected to the piping structure and configured to receive water from the first piping structure for storing hot water.

8. An apparatus according to claim 4, further comprising of a hot water tank fluidly connected to the piping structure and configured to receive water from the first piping structure for storing hot water.

9. An apparatus according to claim 1, further comprising two to four arch supports arranged over the top of the residence or building so that the residence or building is suspended below the arch supports, the arch supports connected by support bars that bear the weight of the Fresnel lenses or magnifying glasses and radiator tubes and provide an earthquake-resistant structure for the residence or building.

* * * * *

UNITED STATES PATENT AND TRADEMARK OFFICE
CERTIFICATE OF CORRECTION

PATENT NO. : 11,624,511 B2
APPLICATION NO. : 17/321100
DATED : April 11, 2023
INVENTOR(S) : Stauffer It is certified that error appears in the above-identified patent and that said Letters Patent is hereby corrected as shown below:

In the Specification

Column 3, Line 67: "tire" should be "the".
Column 4, Line 38: "instant:" should have no ":" at the end.
Column 6, Line 34: "comp rising" should be "comprising".
Column 7, Line 5: Remove "," after "that".
Column 7, Line 23: "mid" should be "and".
Column 7, Line 35: "inf" should be "in".
Column 7, Line 38: "I n" should be "in".
Column 8, Line 3: Remove "," after that in "that, water".
Column 9, Line 10: "I" in "It" should not be capitalized.
Column 9, Line 35: Add "Application" to read "U.S. Patent Application No. 13734978".

In the Claims

Column 10, Line 5: "a nd" should be "and".
Column 10, Line 24: "Col lector" should be "collector".
Column 10, Line 34: "waterfrom" should be "water from".
Column 10, Line 42: There should be a "," after "pressurization".
Column 12, Line 5: "waterfrom" should be "water from".
Column 12, Line 10: "waterfrom" should be "water from".

Signed and Sealed this
Fourth Day of July, 2023

Katherine Kelly Vidal
*Director of the United States Patent and Trademark Office*